Sept. 9, 1969     D. G. SMITH ET AL     3,465,952

PISTON AND CONNECTING ROD STRUCTURE FOR AIR COMPRESSORS

Filed March 26, 1968

INVENTOR.
DRESDEN G. SMITH
PHILLIP T. JONES

BY Allen and Chromy

ATTORNEYS

United States Patent Office 3,465,952
Patented Sept. 9, 1969

3,465,952
PISTON AND CONNECTING ROD STRUCTURE
FOR AIR COMPRESSORS
Dresden G. Smith, San Jose, and Phillip T. Jones, Los Altos, Calif., assignors to Jonesmith Company, Inc., a corporation of California
Filed Mar. 26, 1968, Ser. No. 716,191
Int. Cl. F04b 39/10, 21/08
U.S. Cl. 230—190                    3 Claims

ABSTRACT OF THE DISCLOSURE

A piston and connecting rod structure for an oilless air compressor. The piston is of plastic material having good flexibility and lubricity properties, and the connecting rod is of metal provided with a ball end which is snapped into the piston by deforming the flexible flanged end of the piston skirt. The ball end of the piston rod is held assembled with the piston by said flange as the piston is reciprocated in the compressor cylinder by a rotating eccentric mechanism. The ball end of the piston rod also controls the air intake port so that the need for a separate intake valve is eliminated and also the need for a separate wrist pin is eliminated.

DESCRIPTION OF THE INVENTION

This invention relates to piston and connecting rod structure for air compressors.

An object of this invention is to provide an improved piston and connecting rod structure for compressors such as oilless air compressors.

Another object of this invention is to provide an improved air compressor employing a piston of plastic material having good flexibility and lubricity properties and a connecting rod having a ball end positioned in the piston, said ball end functioning not only as a means connecting the piston rod to the piston, but also as an air intake valve for the compressor.

Other and further objects of this invention will be apparent to those skilled in the art to which it relates from the following specification, claims and drawing.

In accordance with this invention there is provided an air compressor with improved piston and connecting rod structure of excellent reliability and durability, which is economical to manufacture. The piston is made of plastic having good flexibility and lubricity properties. The piston rod is provided with a ball end which is snapped into the piston prior to the assembly of the piston with the air compressor cylinder. An air intake port is provided to the face of the piston and this air intake port is adapted to be closed by the ball end of the piston rod during the compression stroke of the piston, and opened during the return stroke so that air may be sucked into the cylinder therethrough on said return stroke.

The air compressor employing this invention thus has the advantage of low intake valve pressure drop due to actuation of the valve by the ball end of the connecting rod instead of by air pressure. Consequently, the intake valve cannot be jammed by foreign material since it is cleared by the rectilinear motion of the ball end of the piston rod.

Additional features of this invention will be set forth in the following specification, claims and drawing, in which, briefly:

Figure 1:
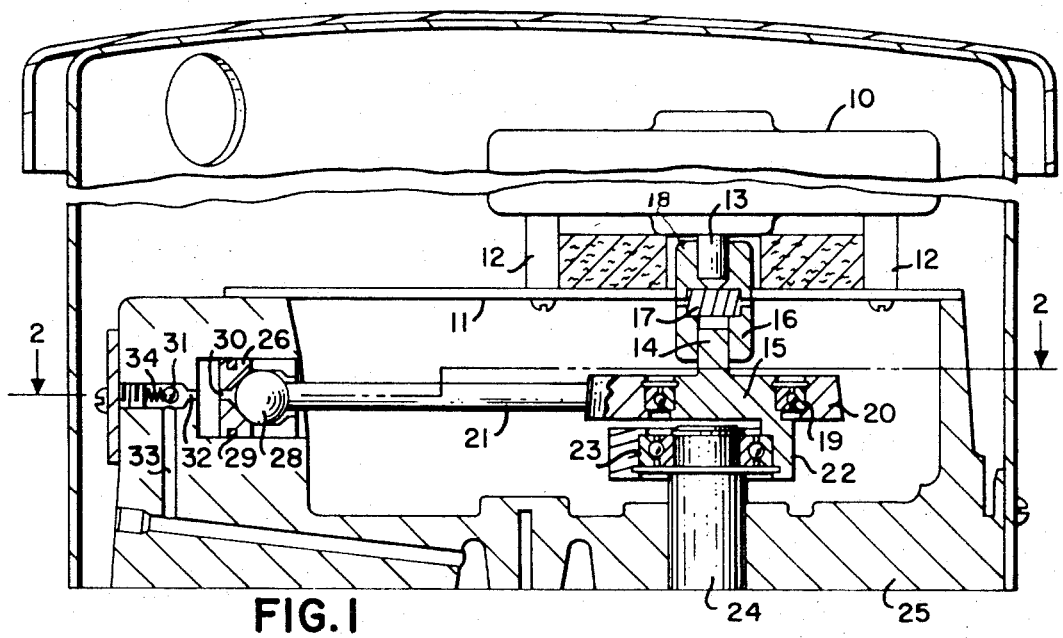
FIG. 1 is a vertical sectional view, partially broken away, showing an embodiment of an air compressor employing this invention.
Figure 2:
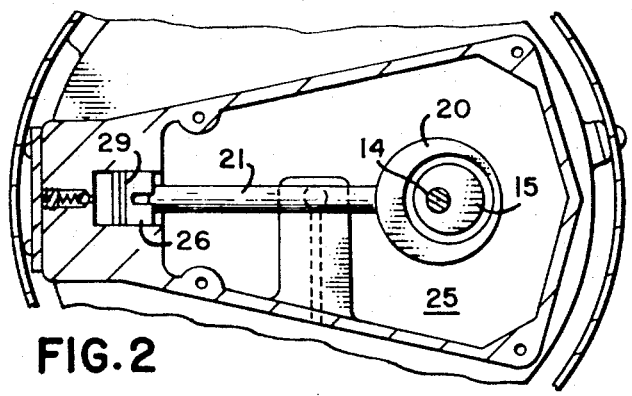
FIG. 2 is a sectional view taken along the line 2—2 in FIG. 1 and is also partially broken away.

Referring to the drawing in detail, there is shown in FIG. 1 an air compressor of the type disclosed and claimed in our Patent No. 3,331,328 issued July 18, 1967. This invention may, however, be used with other types of air compressors and the compressor of our prior patent is employed here only for purposes of illustration. The compressor is provided with an electric motor 10 which is mounted on the cover plate 11 of frame 25 by the posts 12. The shaft 13 of the motor is coupled to the shaft 14 of the eccentric 15 by the coupling members 16, 17 and 18 which are of conventional design.

The driving end 20 of the piston rod 21 is provided with a circular hole in which the ball bearing assembly 19 is positioned, and this ball bearing assembly connects the driving end of the piston rod to the eccentric 15. The eccentric 15 is provided with a lower portion 22 which is hollowed out to receive the ball bearing assembly 23 which is supported by the post 24. Post 24 is positioned in a hole in the frame 25 and is held assembled with this frame by a set screw (not shown) so that the post may be raised or lowered in the frame and thus the piston rod 21 may be aligned with respect to the piston 26 and cylinder 27.

Figure 6:
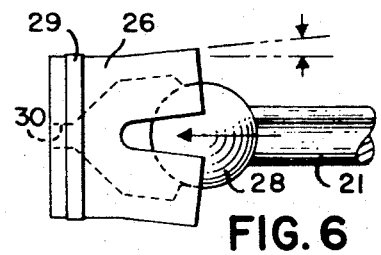
FIG. 6 is a detail view showing the ball end of the piston rod being snapped into the flexible skirt segments of the piston.
Figure 5:
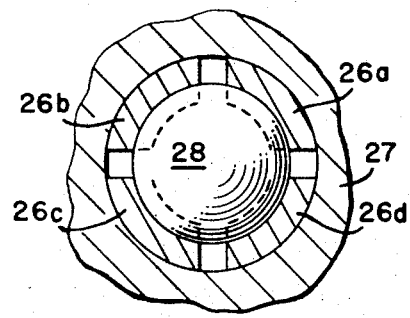
FIG. 5 is a sectional view taken along the line 5—5 of FIG. 3.

The piston rod 21 is provided with a ball end 28 which is integral therewith and which is adapted to be snapped into the piston 26 by spreading the inwardly extending flanges on skirt segments 26a, 26b, 26c and 26d, shown in FIGURES 5 and 6. For this purpose the piston 26 is made of plastic material, such as nylon, "Delrin," "Teflon" and the like, having good flexibility. The piston 26 is also provided with a groove for receiving the piston ring 29.

Figure 3:
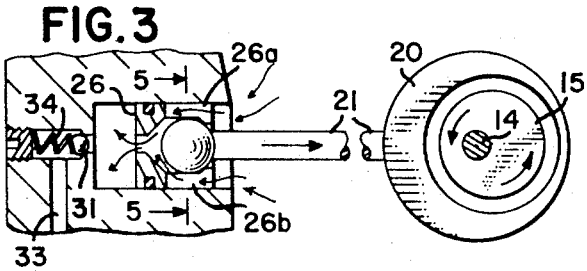
FIG. 3 is a sectional view showing the position of the ball end of the piston rod with respect to the piston during the return stroke of the piston.
Figure 4:
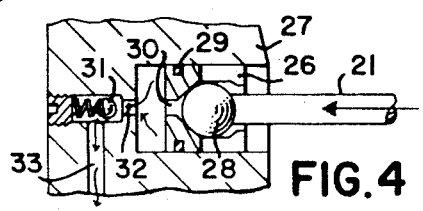
FIG. 4 is a view similar to FIG. 3 showing the ball end of the piston rod closing the air inlet port in the piston during the compression stroke of the piston.

The piston 26 is also provided with an air inlet or intake port 30 and the inner surface of this port is shaped to form a seat for the ball end 28 of the piston rod so that the port 30 is closed by the aforesaid ball end during the compression stroke, as shown in FIG. 4. During the compression stroke the compressed air presses the ball 31 off of its seat around the port 32 so that the compressed air is forced out of the cylinder and into the bore 33 which may be connected to a suitable tank (not shown). A coil spring 34 is provided for pressing the ball 31 against its seat during the air intake stroke, as shown in FIG. 3 so that air is not drawn through the port 32 into the cylinder. During the return stroke, the ball end 28 of the piston rod engages the inner surfaces of the inwardly extending flange segments of the piston skirt, as shown in FIG. 3, so that port 30 in the piston is open and air passes through the slots in the piston skirt and through the port 30 into the cylinder.

While we have shown a preferred form of this invention, it will be understood that the invention is capable of variation and modification from the form shown so that the scope thereof should be limited only to the proper scope of the claims appended hereto.

What we claim is:

1. A piston and connecting rod structure for air compressors comprising the combination of a piston of flexible plastic requiring no lubrication, a piston rod having a ball-shaped end, said piston having a recess adapted to receive said ball-shaped end of said piston rod, said recess being substantially surrounded by segments of the skirt of said piston, said skirt segments having inwardly extending flanges that prevent said ball-shaped end of said piston being withdrawn from said piston when said piston is reciprocated by said rod in the cylinder of the air compressor.

2. A piston and connecting rod structure for air compressors comprising the combination as set forth in claim 1, further characterized in that said piston is provided with a port in the face thereof through which air is drawn into the cylinder of the air compressor during the return stroke of said piston, said piston having a seat for said ball-shaped end of said piston rod around said port, said piston being adapted to move with respect to said ball-shaped end of said piston rod in its axial direction a predetermined distance each time the direction of the stroke thereof reverses so that said ball-shaped end engages said seat to close said port during the compression stroke of said piston.

3. A piston and connecting rod structure for air compressors comprising the combination as set forth in claim 1, further characterized in that said piston is provided with slots between said skirt segments forming air passages during the return stroke of said piston, said skirt segments being expandable so that said ball-shaped end of said piston rod is adapted to be inserted into said piston when said piston is free.

References Cited

UNITED STATES PATENTS

| | | | |
|---|---|---|---|
| 395,044 | 12/1888 | Farnsworth | 230—190 |
| 693,920 | 2/1902 | Sterrett | 103—178 |
| 1,322,552 | 11/1919 | Evans | 103—178 |
| 1,449,034 | 3/1923 | Calaway | 287—21 |
| 1,692,395 | 11/1928 | Thomas | 230—190 |
| 2,082,019 | 6/1937 | McDougall | 103—178 |
| 2,352,410 | 6/1944 | Rushmer | 103—225 |
| 2,885,719 | 5/1959 | Nordmark et al. | 287—21 |
| 3,173,344 | 3/1965 | Mongitore | 287—21 |

HENRY F. RADUAZO, Primary Examiner

U.S. Cl. X.R.

92—187; 103—216; 287—21